(12) United States Patent
Sardes et al.

(10) Patent No.: US 10,723,191 B1
(45) Date of Patent: Jul. 28, 2020

(54) IN-WHEEL THREE-ARM SUSPENSION FOR VEHICLES

(71) Applicant: SOFTWHEEL LTD., Tel-Aviv (IL)

(72) Inventors: Ahishay Sardes, Tel-Aviv (IL); Ran Dekel, Nofit (IL); Tomer Segev, Tel-Aviv (IL); Eran Starik, Ra'anana (IL)

(73) Assignee: SOFTWHEEL LTD., Tel-Aviv (IL)

( * ) Notice: Subject to any disclaimer, the term of this patent is extended or adjusted under 35 U.S.C. 154(b) by 0 days.

(21) Appl. No.: 16/268,616

(22) Filed: Feb. 6, 2019

Related U.S. Application Data

(60) Provisional application No. 62/692,787, filed on Jul. 1, 2018.

(51) Int. Cl.
*B60G 3/22* (2006.01)

(52) U.S. Cl.
CPC ............ *B60G 3/22* (2013.01); *B60G 2200/18* (2013.01); *B60G 2204/30* (2013.01)

(58) Field of Classification Search
CPC ... B60G 3/22; B60G 2200/18; B60G 2204/30
See application file for complete search history.

(56) References Cited

U.S. PATENT DOCUMENTS

| | | | |
|---|---|---|---|
| 3,578,354 A | 5/1971 | Schott | |
| 10,173,463 B2 * | 1/2019 | Barel | B60G 3/01 |
| 2006/0012144 A1 | 1/2006 | Kunzler | |
| 2008/0185807 A1 * | 8/2008 | Takenaka | B60G 3/14 |
| | | | 280/124.153 |
| 2011/0260422 A1 * | 10/2011 | Kuttner | B60G 3/20 |
| | | | 280/124.113 |
| 2012/0175857 A1 * | 7/2012 | Mathis | B60G 3/20 |
| | | | 280/124.113 |
| 2014/0300037 A1 * | 10/2014 | Winshtein | B60B 9/06 |
| | | | 267/64.15 |
| 2015/0191064 A1 * | 7/2015 | Gielisch | B60G 3/145 |
| | | | 280/124.129 |
| 2018/0072120 A1 * | 3/2018 | Hunter | B60G 3/01 |

FOREIGN PATENT DOCUMENTS

| | | |
|---|---|---|
| DE | 102013013324 | 2/2015 |
| EP | 2560832 | 2/2015 |
| JP | 201700141 | 1/2017 |

OTHER PUBLICATIONS

International Search Report of PCT International Application No. PCT/IL2019/050725, dated Oct. 29, 2019.

* cited by examiner

*Primary Examiner* — Drew J Brown
(74) *Attorney, Agent, or Firm* — Pearl Cohen Zedek Latzer Baratz LLP

(57) ABSTRACT

An in-wheel suspension system includes an assembly with a main arm that is pivotally connected at a connection point on the main arm to a shaft point of a wheel, a first linkage unit pivotally connected at one end to a first end of the main arm, and a second linkage unit pivotally connected at one end to a second end of the main arm. At least one second end of the first linkage unit and at least one second end of the second linkage unit, that are not connected to the main arm, are pivotally connectable each to a reference frame at a defined distance between them, such as to form a substantially "Z" like shape.

19 Claims, 9 Drawing Sheets

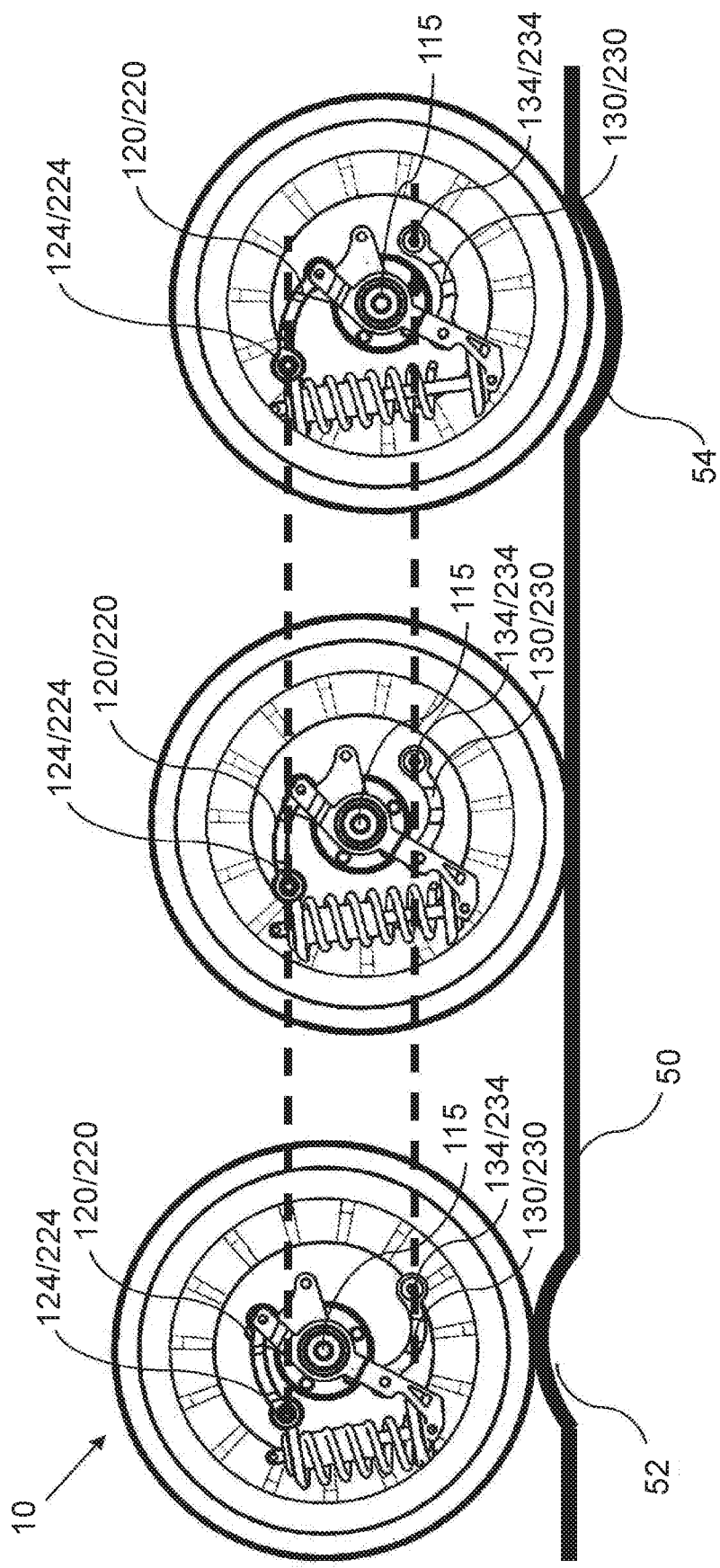

IN-WHEEL THREE-ARM SUSPENSION FOR VEHICLES

CROSS-REFERENCE TO RELATED APPLICATIONS

This application claims priority from U.S. Provisional Patent Application No. 62/692,787, filed Jul. 1, 2018, which is hereby incorporated by reference.

TECHNICAL FIELD OF THE INVENTION

The invention generally relates to suspension systems for vehicles, and more particularly to in-wheel suspension systems for vehicles.

BACKGROUND OF THE INVENTION

Suspension systems are the systems configured to suspend a vehicle chassis above its wheels, to maintain good grip on the road while isolating the vehicle systems from road shocks and impacts. These can be contradicting demands that require compromising. Commonly used suspension systems, either rear or front, include: springs, shock absorbers and the linkages between to the vehicle's chassis and the wheels, all of which are external to the wheels.

In-wheel suspension systems have several advantages as well as challenges that must be overcome. Such suspension systems can reduce the weight of the vehicle and allow flexible damping of each wheel separately. There are several examples of in-wheel suspension systems which require complicated connections to the vehicles' chassis or the use of an expensive electrical suspension system in connection to an electrical motor. Such systems cannot be implemented to every vehicle.

The Watt's linkage (also known as the parallel linkage) is a well-known mechanical linkage made from three arms, in a "Z" like shape configuration, in which a central moving point of the central arm is configured to move in a substantially straight line. Such a mechanism can be used in vehicles suspension systems, allowing an axle of a vehicle to travel vertically while preventing sideways motion. When used in a vehicle suspension system, the Watt's linkage is assembled external to the wheel.

Never before has there been an attempt to combine the Watt's linkage in an in-wheel suspension system, such that the entire Watt's linkage is located in the inner rim of the wheel.

SUMMARY OF THE INVENTION

Some aspects of the invention are directed to an in-wheel suspension system that includes: an assembly that may include: a main arm pivotally connectable at a connection point (e.g., a midpoint) on the main arm to a shaft point of a wheel (e.g., included in: a hub-shaft of the wheel, a bearing of the wheel, an axle of the wheel, etc.), at least a first linkage unit pivotally connected at a first end to a first end of the main arm, and at least a second linkage unit pivotally connected at a first end to a second end of the main arm, wherein at least one second end of the first linkage unit and at least one second end of the second linkage unit, that are not connected to the main arm, may be pivotally connectable each to a reference frame at a defined distance between them, such as to form a substantially "Z" like shape.

In some embodiments, the assembly further includes at least a third linkage unit having a first end pivotally connected to the main arm at a defined location and a second end pivotally connected to the reference frame.

In some embodiments, least one of the first end and the second end of the third linkage unit may be pivotally connected via a spherical joint.

In some embodiments, least one of a first end of the first linkage unit pivotally connected at the first end of the main arm and a first end of the second linkage unit pivotally connected at the second end of the main arm are pivotally connected via a spherical joint.

In some embodiments, the at least one second end of the first linkage unit and at least one second end of the second linkage unit are connected so as to allow the respective unit to pivot axially around a first axis and a second axis respectively.

In some embodiments, the first axis and the second axis may be off parallel from each other.

In some embodiments, each linkage unit comprises one or more linking elements and two or more pivoting connections.

In some embodiments, the one or more linking elements may be selected from the group consisting of: an arm, a rod, a lever and a shaft.

In some embodiments, the two or more pivoting connections are selected from the group consisting of: bearings, hinges and spherical joints.

In some embodiments, the assembly may be configured to restrict the movement of the connection point with respect to the second ends of the first and the second linkage units along a substantially straight line.

In some embodiments, the overall width of the assembly exceeds the depth of the inner rim of the wheel.

In some embodiments, overall width of the assembly may be at most the depth of the inner rim of the wheel.

In some embodiments, the suspension system further includes: a shock absorbing unit. In some embodiments, the shock absorbing unit may be connected to the assembly between two connection points configured to allow the shock absorbing unit to alter its length in response to change in the position of at least one of: the main arm and the first and second linkage units. In some embodiments, a rotary shock absorbing unit may be connected to one of the pivoted connections of at least one of: the main arms and the first and second linkage units. In some embodiments, the shock absorbing unit may be connected between one of: the first end of the main arm and the at least one second end of the second linkage unit.

In some embodiments, the shock absorbing unit may be selected from the group consisting of: a spring, mono-tube shock absorber, twin-tube shock absorber, Coilover shock absorber, a rotary damper, air shocks absorber, magnetic shocks absorber, energy harvesting shocks absorber and hydro-pneumatic shocks absorber.

In some embodiments, the reference frame may be one of: a chassis of the vehicle an element connectable to the chassis of the vehicle, an element connected to a conveyor, an element connected to a landing gear of an airplane and the like.

In some embodiments, the maximal allowable movement of the at least one second end of the first linkage unit or the at least one second end of the second linkage unit with respect to the connection point of the main arm may be less than a radius of an inner rim of the wheel.

In some embodiments, a wheel may be presented, including an inner rim and the in-wheel suspension system according to description above, assembled in the inner rim.

In some embodiments, a method of assembling the in-wheel suspension system according to description above in a vehicle is disclosed, including providing at least one in-wheel suspension assembly and a shock absorbing unit. In some embodiments, the shock absorbing unit may be connected to the assembly between two connection points configured to allow the shock absorbing unit to alter its length in response to change in the position of at least one of: the main arm and the first and second linkage units. In some embodiments, the shock absorbing unit may be connected to one of: the pivoted connections of the main arms and the first and second linkage units. In some embodiments, the method may further include placing the in-wheel suspension system inside an inner rim of the wheel, pivotally connecting a connection point (e.g., at the midpoint) of the main arm to a shaft point of the wheel (e.g., a point on the axis of: a hub shaft, a bearing, an shaft of the wheel, etc.), and pivotally connecting at least one second end of the at least one first linkage unit and at least one second end of the second linkage unit at a defined distance between them to a reference frame, such as to form a substantially "Z" like shape.

In some embodiments, the reference frame may be one of: a chassis of the vehicle and an element connectable to the chassis of the vehicle.

In some embodiments, the shock absorbing unit may be selected from the group consisting of: a spring, mono-tube shock absorber, twin-tube shock absorber, Coilover shock absorber, a rotary damper, air shocks absorber, magnetic shocks absorber, energy harvesting shocks absorber and hydro-pneumatic shocks absorber.

In some embodiments, the connection point with respect to the second ends of the first and the second linkage units may be restricted to move along a single substantially straight line.

In some embodiments, the maximal allowable movement of the at least one second end of the at least one first linkage unit or the at least one second end of the at least one second linkage with respect to the connection point of the main arm may be less than a radius of the inner rim of the wheel.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 5A-5C are illustrations of the position of the arms of the in-wheel suspension system at 3 different positions of the wheel and the reference frame, according to some embodiments of the invention;

Figure 1A:
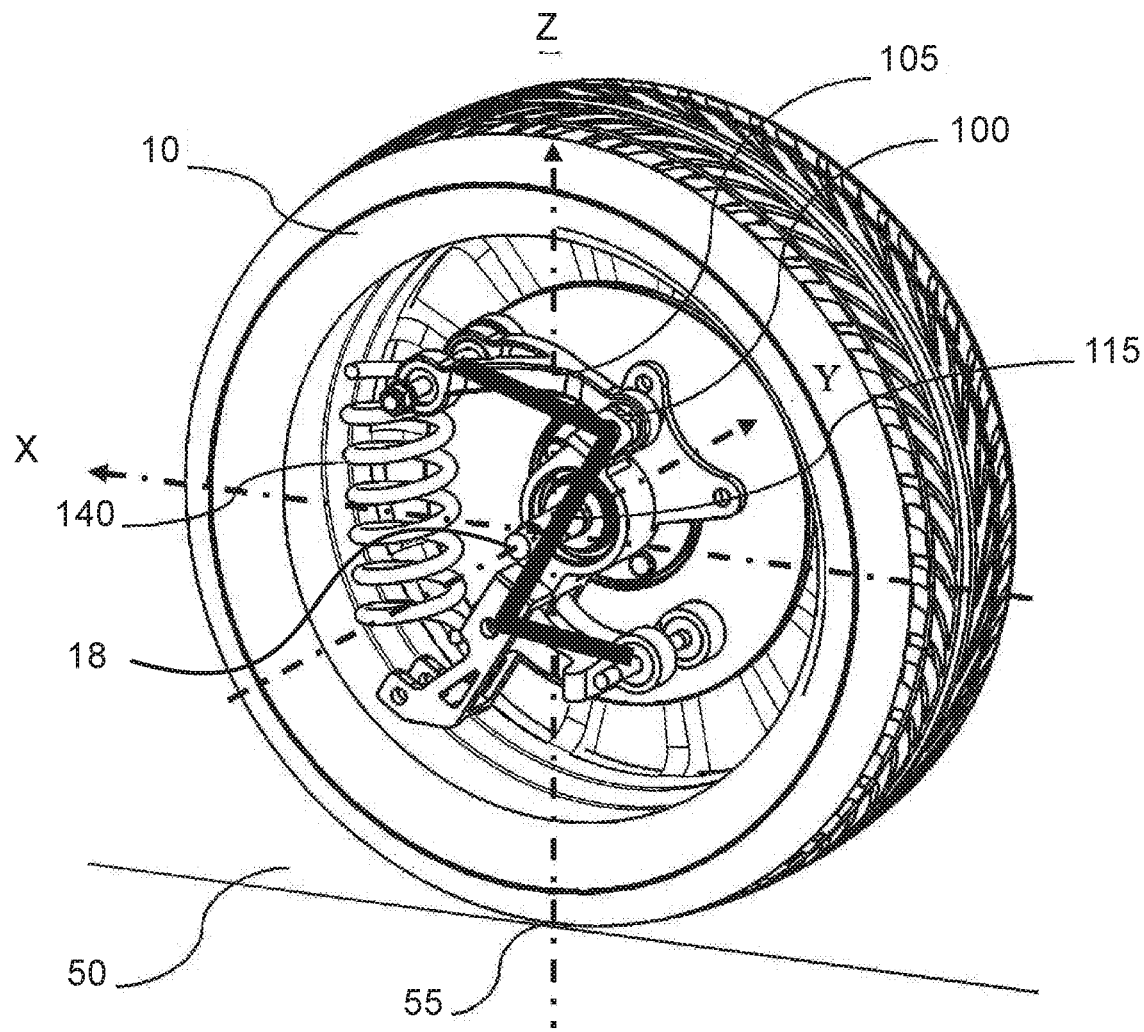
FIG. 1A is a schematic illustration of an in-wheel suspension system assembled in a wheel traveling on a road according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Aspects of the invention may be related to an in-wheel suspension system that may include three arms in a Watt's linkage configuration all been assembled inside an inner rim of a wheel. Such a suspension system may be compact, light-weight and may further allow the damping of each wheel separately, such that a bump or pothole in a road under one wheel may not affect at all any one of the other suspension systems of the other wheels. The in-wheel suspension system according to some embodiments of the invention may further include a shock absorbing unit for damping and absorbing shocks from the bumps or potholes in the road.

To better illustrate the general concepts of the invention, reference is now made to FIG. 1A, which is a schematic illustration of an in-wheel suspension system assembled in a wheel, for example, a wheel traveling on a road according to some embodiments of the invention. An in-wheel suspension system 100 may be assembled so it may be accommodated at least partially within a wheel 10 and may be connected to a reference frame 8 of the vehicle (e.g., the chassis) indicated as dashed lines. In-wheel suspension system 100 may include a suspension assembly 105 and a shock absorbing unit 140. Suspension assembly 105 may have, when assembled in wheel 10 and connected to a reference frame (e.g., the vehicle chassis), substantially a 'Z' like shape (as illustrated). The substantially a 'Z' like shape may relate to a straight 'Z' like shape and to a mirror image of a 'Z' like shape. The 'Z' like shape may be defined at a single plane (i.e., movements of its two parallel or near to parallel parts are in the same plane) or may have three-dimensional configuration (i.e., its two parallel or near to parallel parts may operate out of a common plane). Accordingly, any shape that includes a main arm connected at each of its ends to an additional arm (or units) such that the other ends of the two arms are pointing at substantially opposite directions—are in the scope of the invention.

Figure 1B:
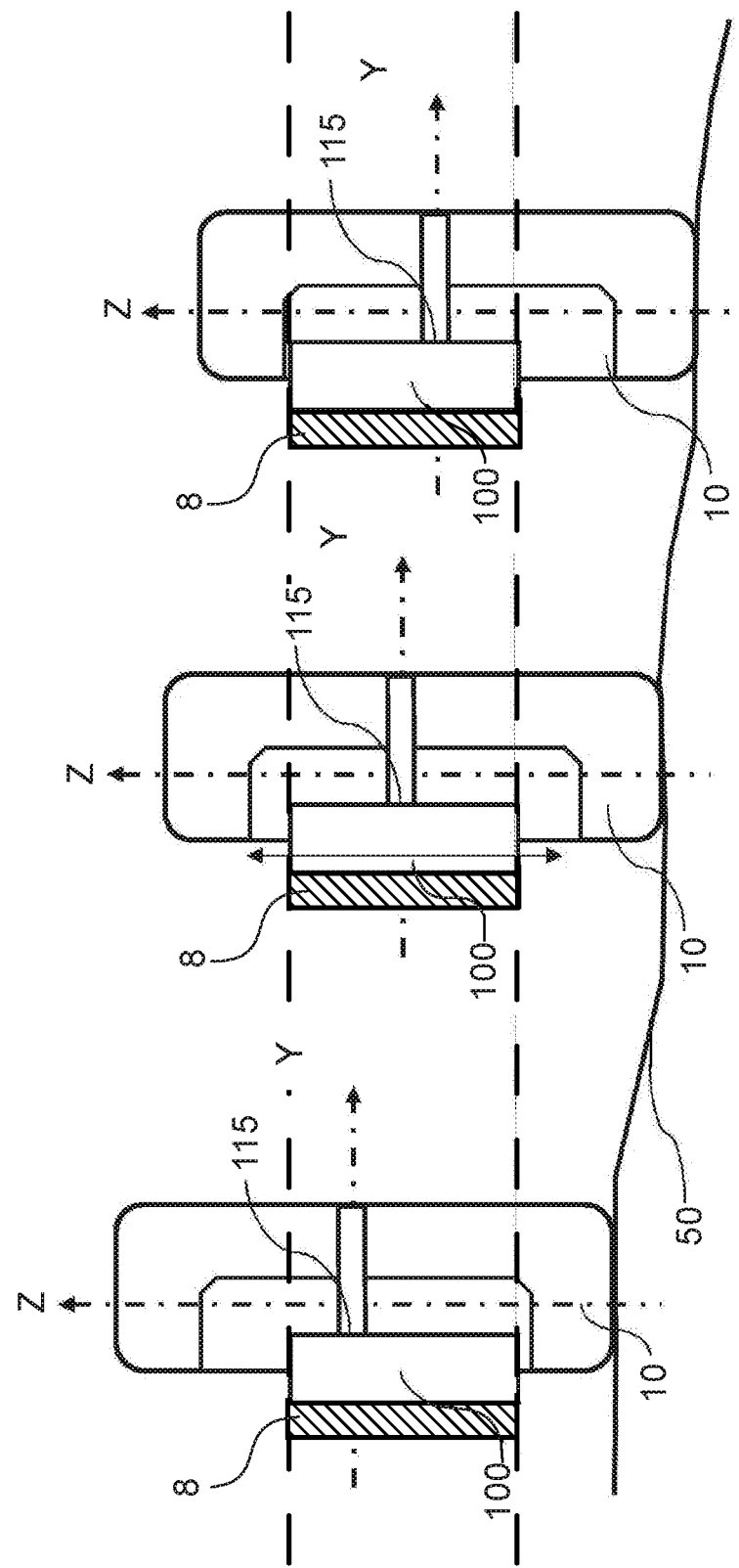
FIG. 1B is a schematic illustration an in-wheel suspension system assembled in a wheel at various poisons on the road according to some embodiments of the invention.

The 'Z' like shape of assembly 105 may allow connection point 115 (e.g., the midpoint) to connect assembly 105 to a shaft point 18 of wheel 10 and to move in a substantially straight line, permitting upright movement in the direction of the Z axis in the drawing when wheel 10 is on road 50. In some embodiments, shaft point 18 of wheel 10 may be the axis of at least one of: hub shaft, a bearing, a shaft of the wheel 10, etc. The Z direction is defined by a line passing through point 55 at which wheel 10 touches road 50 and through connection point 115. Directions X and Y are orthogonal to direction Z, wherein direction X is the direction of the rolling of wheel 10. In some embodiments, connection point 115 may be located at the midpoint, thus substantially the same distance from road 50 regardless of the conditions, such as bumps or potholes in road 50, as illustrated in FIG. 1B, the 'Z' like shape of assembly 105 may allow connection point 115 to move, with respect to all the other elements of system 100, in a substantially straight line along the Z axis direction or any other direction. Thus, in some embodiments, when a chassis of the vehicle is connected to assembly 105 the chassis (and other system of the vehicle) may be allowed to move with respect to road 50, as will be illustrated and discussed in detail in FIGS. 5A-5B.

Reference is now made to FIGS. 2A-2D which are illustrations of in-wheel suspension assemblies according to some embodiments of the invention. A suspension assembly 105 may include a main arm 110 (also known in the art as an upright) pivotally connectable at a connecting point 115, 115' or 155" of main arm 110 to a shaft point 18 of wheel 10, which may be on the axis of a hub shaft 18, a wheel axle 18, or a bearing 18 of a wheel 10 (illustrated in details in FIGS. 3A-3B). As used herein, the term "pivotally connected" may refer to any pivoting connection, either a straight pivot (e.g., a bearing) or a spherical joint. Suspension assembly 105 may further include at least a first linkage unit 120 pivotally connected at a first end 122 to a first end of main arm 110 and at least a second linkage unit 130 pivotally connected at a first end 132 to a second end of main arm 110.

In some embodiments, the connection point may be positioned at the midpoint 115 of main arm 110. Connection point 115 may be located at even distances from the connections at first end 122 and first end 134. In some embodiments, other locations may be considered for the connection point, for example, asymmetrical connection points 115' and 115" located at different distances from first end 122 and first end 134. For example, an asymmetrical arrangement may allow suspension system 100 and a shock absorbing unit (e.g., shock absorbing unit 140 illustrated in FIGS. 3A-4B) to encounter a bump (e.g., when the wheel travels upwards relative to the chassis) while experiencing greater forces than when encountering a pothole. In some embodiments, an asymmetrical arrangement may include, different lengths for first linkage unit 120 and second linkage unit 130.

As should be understood by one skilled in the art, the connection point 115 illustrated at even distances from the connections at first end 122 and first end 134, in FIGS. 2-5, is given as an example only. In some embodiments, asymmetrical locations 115' and 115" may be considered as optional replacements to connection point 115.

In some embodiments, at least one second end 124 of first linkage unit 120 and at least one second end 134 of second linkage unit 130 that are not connected to main arm 110 may be pivotally connected each to a reference frame 8 (illustrated in FIG. 3B) at a defined distance between them, such as to form a substantially "Z" like shape. The substantially "Z" like shape may allow main arm 110 and at one first linkage unit 120 and at least one second linkage unit 130 to form and act as a Watt's linkage configuration.

As used herein, a substantially "Z" like shape may not necessarily be on a single plane but may have slightly three-dimensional movement, as long as the principle of the Watt's linkage configuration may be sustained. Therefore, in some embodiments, assembly 105 may be configured to restrict the movement of connection point 115 with respect to second ends 124 and 134 of the first and the second linkage units 120 and 130 along a substantially straight line.

Figure 2A:
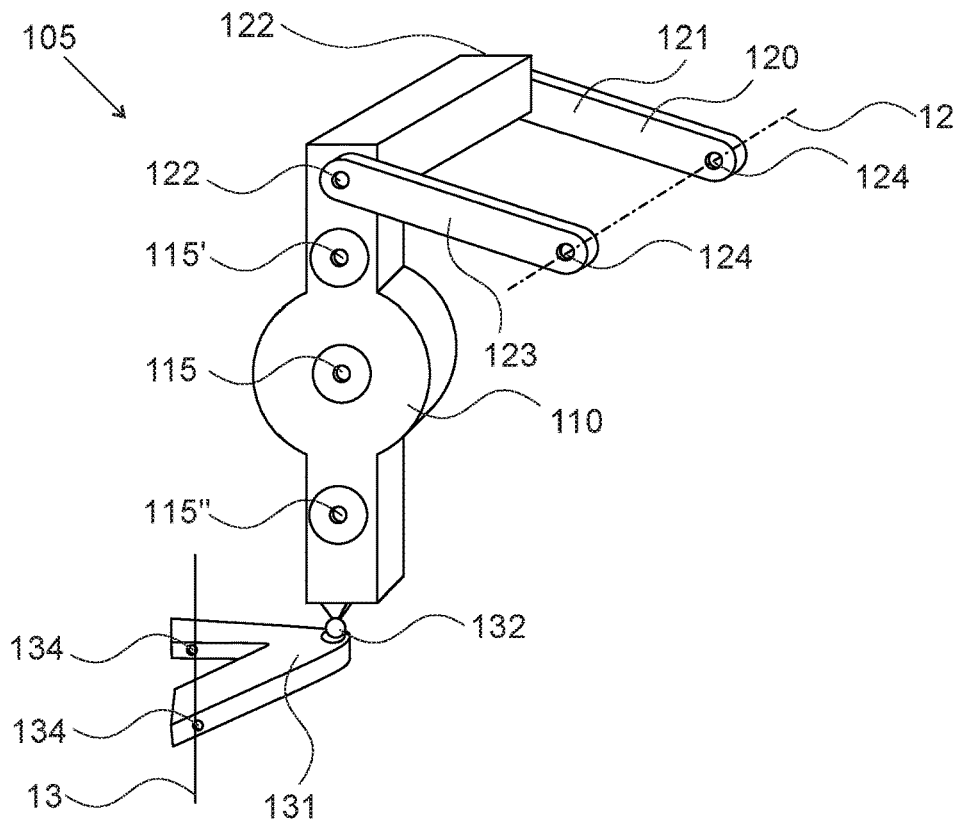
FIGS. 2A-2D are illustrations of in-wheel suspension assemblies according to some embodiments of the invention.
Figure 2B:
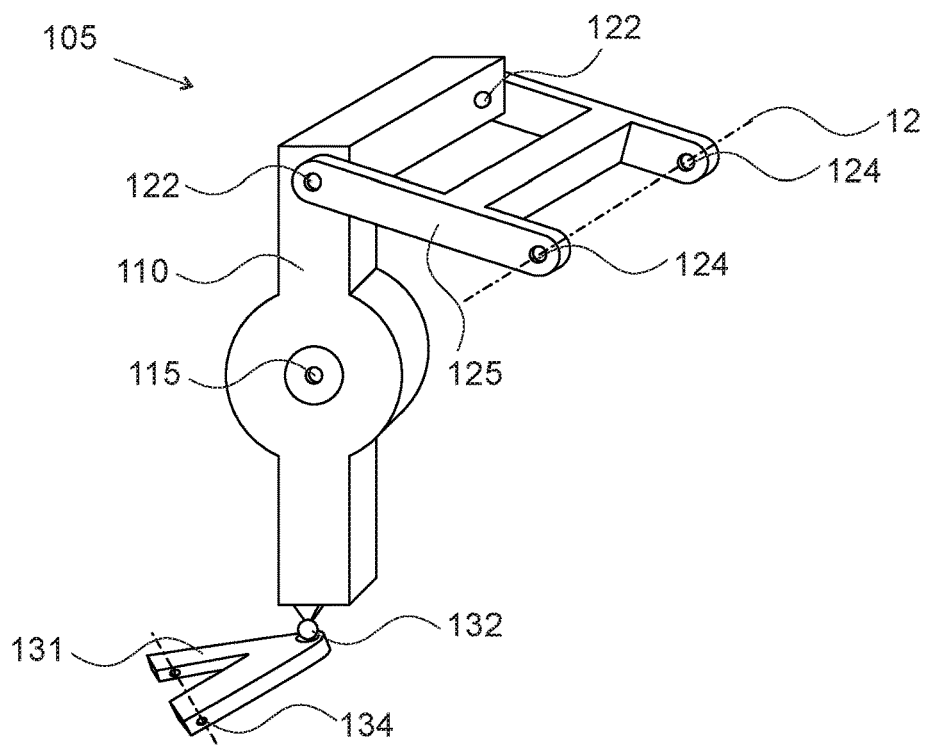
Figure 2C:
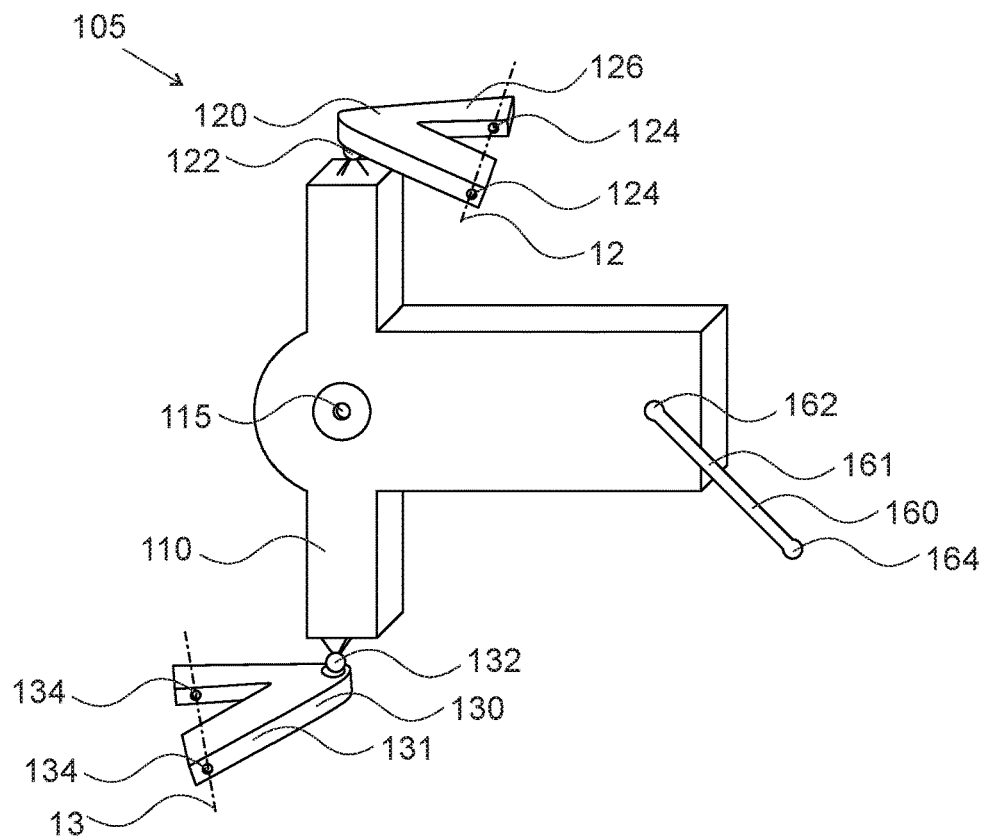
Figure 2D:
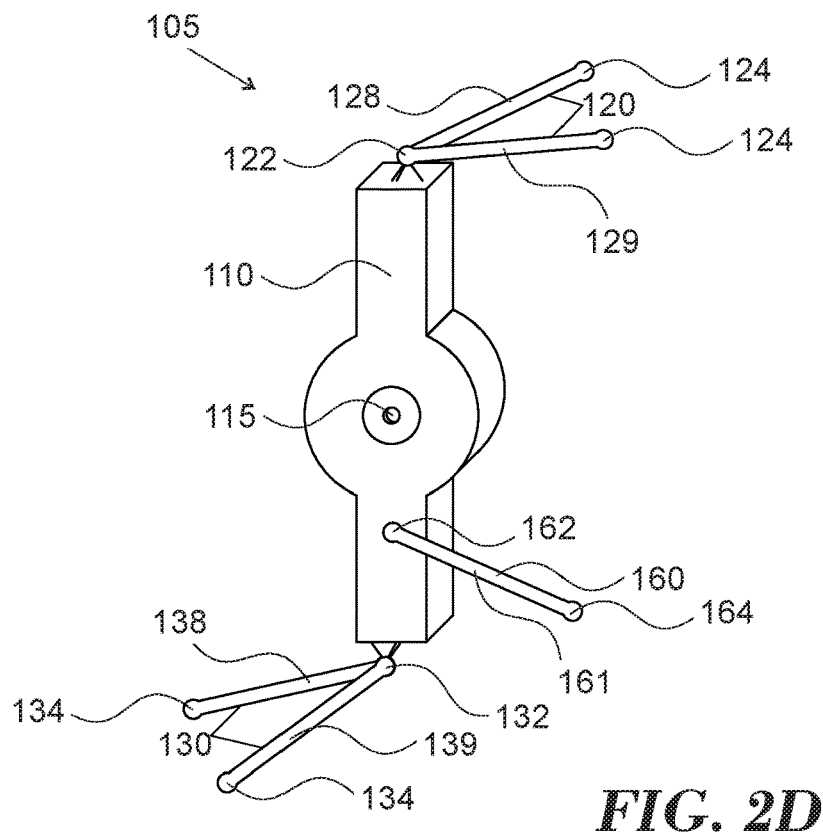

In some embodiments, assembly 105 may further include at least a third linkage unit 160, illustrated in FIGS. 2C and 2D. Third linkage unit 160 may have a first end 162 pivotally connected to main arm 110 at a defined location and a second end 164 pivotally connected to reference frame 8 (illustrated in FIG. 3B). In some embodiments, at least one of first end 162 and second end 164 of third linkage unit 160 may be pivotally connected via a spherical joint, as illustrated.

In some embodiments, each linkage unit 120, 130 or 160 may include one or more linking elements and two or more pivoting connections. A linking element according to embodiments of the invention may include any structural element that can be pivotally connected to main arm 110 and to reference frame 8 (illustrated in FIG. 4B). For example, linking element may include one or more arms, one or more rods, a lever, a shaft and/or a profile as illustrated in FIGS. 2A-2D. For example, first linkage unit 120, illustrated in FIG. 2A, may include two linking elements 121 and 122 (e.g., arms or rods), each being pivotally connected to main arm 110 at two first ends 122, and may further be connected to reference frame 8 at additional two second ends 124.

In another example, illustrated in FIG. 2B, first linkage unit 120 may include a single 'H' like linkage element 125 connected to main arm 110 at two first ends 122 and connected to reference frame 8 (illustrated in FIG. 4B) at additional two second ends 124. In some embodiments, 'H' like linkage element 125 may be pivotally connected to the main arm and/or farm 8 via two axles. In some embodiments, linkage element 125 may not include an 'H' like shape and may be defined merely by being connected via a single axle at each of its ends, a first axle in end 122 and a second axle in end 124. In some embodiments, the 'H' like linkage element 125 may be made from ridged profiles (as illustrated) or may include any other elements either rigidly or pivotally connected.

In yet another example illustrated in FIG. 2C, first linkage unit 120 may include a single 'V' like linkage element 126 connected to main arm 110 a single first ends 122 and may be connected to reference frame 8 at additional two second ends 124. In some embodiments, 'V' like linkage element 126 may be pivotally connected via a spherical joint at one end (e.g., end 122) and via one axle at the other end (e.g., end 124). In some embodiments, linkage element 126 may not include a 'V' like shape and may further be defined only by the two different pivot connections at its two ends.

Figure 4A:
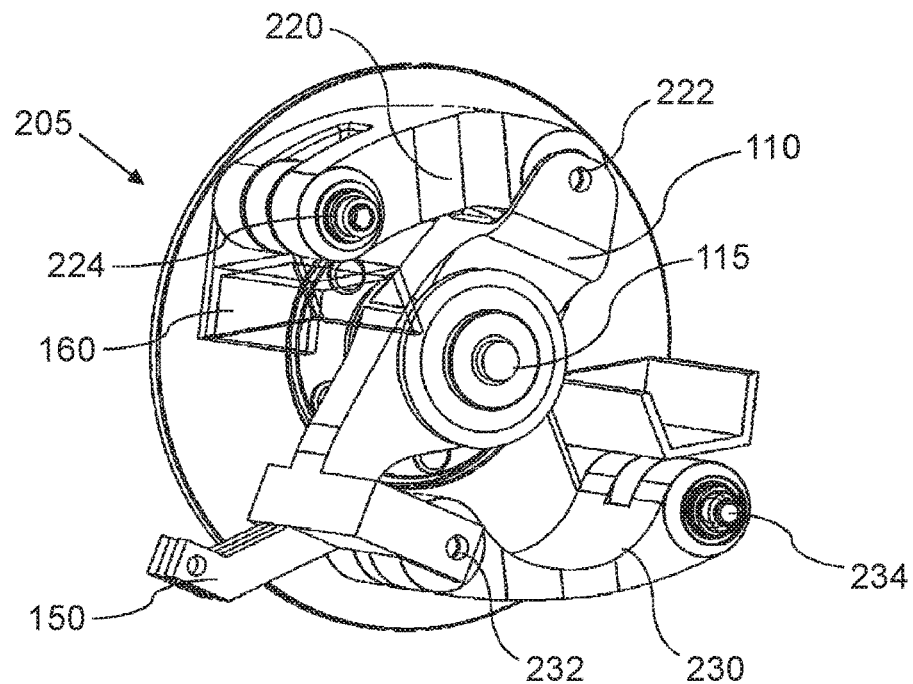
FIG. 4A is an illustration of an in-wheel suspension assembly according to some embodiments of the invention.
Figure 4B:
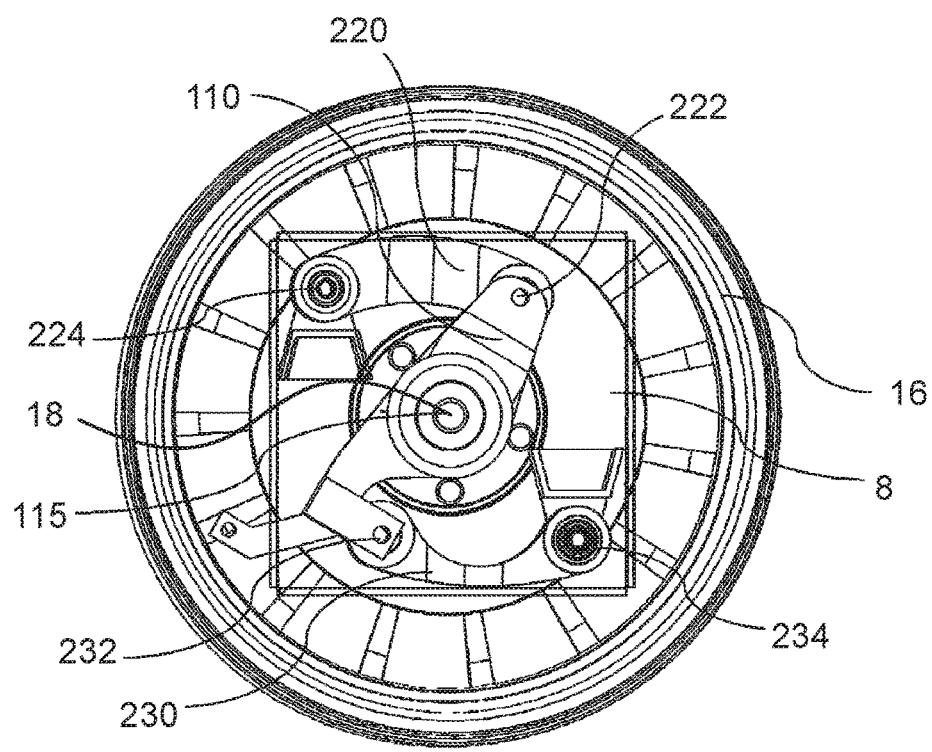
FIG. 4B is illustration of the in-wheel suspension system assembled inside an inner rim of a wheel and connected to a reference frame, according to some embodiments of the invention.

In a forth example illustrated in FIG. 2D first linkage unit 120 may include two linkage elements 128 and 129 each being a rod pivotally connected (e.g., via a spherical joint) at a first end 122 to main arm 110 and at two second ends 124 to a reference frame (e.g., frame 8 illustrated in FIG. 4B). Linkage unit 130 of FIG. 2D may include two linkage elements 138 and 139, each being a rod pivotally connected (e.g., via a spherical joint) at a first end 132 to main arm 110 and at two second ends 134 to a reference frame (e.g., farm 8 illustrated in FIG. 4B), and linkage unit 160 may include a single linkage elements 161 pivotally connected (e.g., via a spherical joint) to main arm 110 at a first end 162 and to the reference frame at second end 164.

In yet additional example, second linkage unit 130 may include a 'V' shaped linkage element 131 illustrated in FIGS. 2A-2C and configured to be connected to main arm 110 at single first ends 132 and may be connected to reference frame 8 (illustrated in FIG. 4B) at additional two second ends 134. In another example illustrated in FIG. 2D, second linkage unit 130 may include two linkage elements 138 and 139 each being a rod pivotally connected (e.g., via a spherical joint) at a first end 132 to main arm 110 and at two second ends 134 to a reference frame. In the embodiment illustrated in FIG. 2C, third linkage unit 160 may include a single linkage element 161 pivotally connected (e.g., via a spherical joint) to main arm 110 at a first end 162 and to the reference frame at second end 164. Additional examples of linkage units and linkage elements are given in FIGS. 3-4.

In some embodiments, pivoting connections to be include in linkage units, 120, 130 and/or 160 may include any connection that may allow pivoting around at least one axis. For example, the pivoting connections may include: bearings, bushings, hinges, spherical joints (e.g., ball joints, Heim joints, etc.) and the like. For example, at least one of first end 122 of first linkage unit 120 may be pivotally connected at the first end of main arm 110 via a spherical joint, as illustrated in FIGS. 2C and 2D. In some embodiments, first end 132 of second linkage unit 130 may be pivotally connected at second end of the main arm 110 via a spherical joint, as illustrated in FIGS. 2A-2D. In some embodiments, first end 122 of first linkage unit 120 and/or first end 132 of second linkage unit 130 may be connected via bearing, as illustrated in FIGS. 3-5.

In some embodiments, at least one second end 124 of first linkage unit 120 and at least one second end 134 of second linkage unit 130 may be connected so as to allow the respective unit to pivot axially around a first axis 12 and around a second axis 13 respectively, as illustrated in FIGS. 2A-2C and FIGS. 3-5. Such a connection may require the use of one or more bearing. In some embodiments, first axis 12 and second axis 13 may be off parallel from each other, as to allow a slight camber of wheel 10.

Figure 3A:
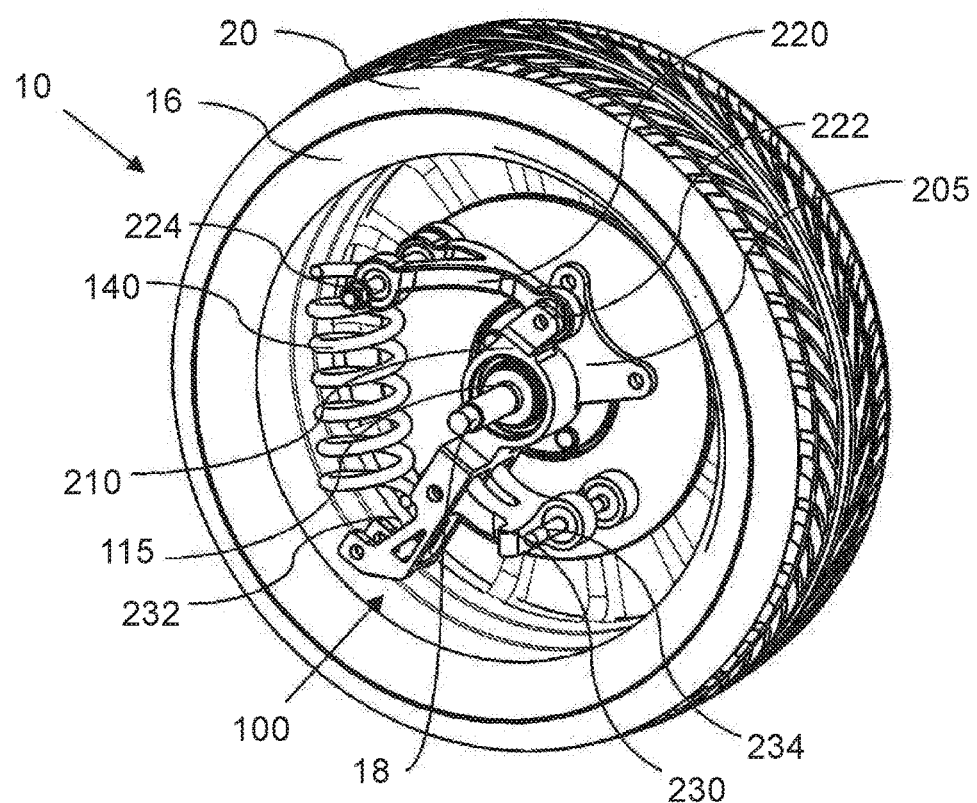
FIGS. 3A and 3B are illustrations of a wheel that includes in-wheel suspension system according to some embodiments of the invention.
Figure 3B:
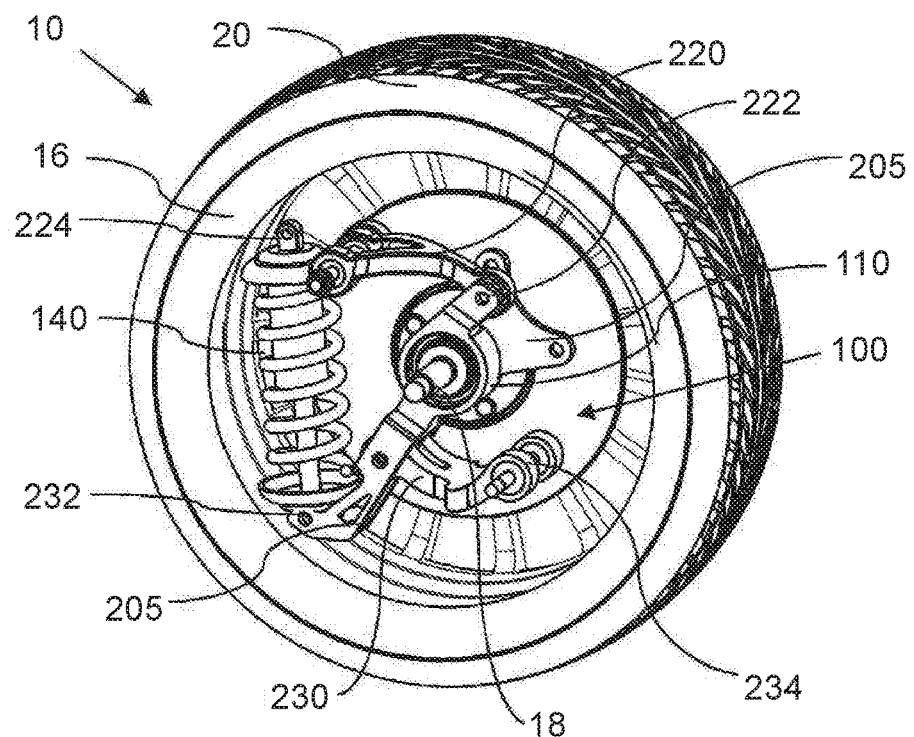

Reference is now made to FIGS. 3A-3B which are illustrations of an in-wheel suspension system assembled inside a vehicle's wheel according to some embodiments of the invention. An in-wheel suspension 100 may be assembled in a wheel 10 of a motorized vehicle or in a wheel 10 of a non-motorized vehicle. In-wheel suspension 100 may include an assembly 205 and a shock absorbing unit 140. Wheel 10 may include a tire 20, an inner rim 16 and a shaft point 18.

Assembly 105, illustrated in greater details in FIG. 4A, may include a main arm 110 (also known in the art as up-right arm) pivotally connectable at a connection point 115 of main arm 110 to shaft point 18 of wheel 10 (e.g., located on the axis of one of: a hub shaft, a bearing of wheel 10, an axle of the wheel 10, etc.), a first linkage unit 220 pivotally connected at a first end 222 to a first end of main arm 110 and a second linkage unit 230 pivotally connected at a first end 232 to a second end of main arm 110. In some embodiments, a second end 224 of first linkage unit 220 and a second end 234 of second linkage unit 230, not connected to main arm 110, may be pivotally connected to a reference frame, for example, a reference frame 8 (e.g., a chassis) illustrated in FIG. 4B. In some embodiments, second end 224 and second end 234 may be pivotally connected at a defined distance between them, such as to form a 'Z' like shape typical to the Watt's linkage configuration.

In some embodiments, connection point 115 of main arm 110 may be restricted to move with respect to second ends 224 of first linkage unit 120 and 234 of second linkage unit 130 along a single substantially straight line, as illustrated and discussed with respect to FIGS. 5A-5C. In some embodiments, at connection point 115, main arm 110 may include any designated bore for holding a bearing configured to bear the hub shaft of wheel 10. In some embodiments, at end 222 and 232, main arm 110 may include designated bores for holding bearings configured to bear pivots as to allow main arm 110 to be pivotally connected to first and the second linkage units 220 and 230. In some embodiments, the designated bores may each be configured to hold a first part of a spherical joint, which may allow the connections between main arm 110 and linkage units 220 and 230 to be pivoted around more than one axis, as disclosed and discussed above with respect to FIGS. 2A-2D.

Main arm 110 may have a profile and dimensions sufficient to sustain forces and stresses applied on main arm 110 from one of: the hub shaft, and/or bearings of wheel 10 and linkage units 220 and 230. Main arm 110 may further be loaded by a shock absorbing unit 140. Main arm 110 may be made from any suitable material, for example, various types of steel, and/or composite materials. For example, a main arm 110 for a passenger car weighing 1600 Kg having rim diameter of 17" may be configured to hold loads of 800 Kg. Such an arm 110 may have a 20 mm thinness profile.

First linkage unit 220 may include a first bore at end 222 for holding a bearing to allow a pivot to pivotally connect first linkage unit 220 to main arm 110. In some embodiments, the bore may hold a second part of a spherical joint to allow linkage unit 220 and main arm 110 to be pivoted around more than one axles. First linkage unit 220 may further include a second bore at end 224 for holding a bearing as to allow a pivot to pivotally connect first linkage unit 220 to reference frame 8 (illustrated in FIG. 4B) and shock absorbing unit 140.

First linkage unit 220 may include a single linkage element having a profile and dimensions sufficient to endure loads and forces applied by main arm 110 shock absorbing unit 140 and the chassis of the vehicle (illustrated in FIG. 4B).

Second linkage unit 230 may include a first bore at end 232 for holding a bearing to allow a pivot to pivotally connect second linkage unit 230 to main arm 110. In some embodiments, the bore may hold a second part of a spherical joint to allow linkage unit 230 and main arm 110 to be pivoted around more than one axle. First linkage unit 220 may further include a second bore at end 234 for holding a bearing to allow a pivot to pivotally connect second linkage unit 230 to reference frame 8 (illustrated in FIG. 4B).

Second linkage unit 230 may have a profile and dimensions sufficient to endure loads and forces applied by main arm 110 and chassis of the vehicle (illustrated in FIG. 4B).

In some embodiments, shock absorbing unit 140 may be any unit that can be assembled into assembly 105 that is configured to absorb, damp, reduce, etc., shocks applied to assembly 105 by external forces. Shock absorbing unit 140 may be a compacted unit that may allow the assembly of suspension system 100 in rim 16. In some embodiments, the shock absorbing unit may be connected to the assembly between two connection points configured to allow the shock absorbing unit to alter its length in response to a change in the position of at least one of: the main arm and the first and second linkage units. For example, such a leaner shock absorbing unit 140 may be connected at one end to one of: first linkage unit 120 and second linkage unit 130 and at the other end to be pivotally connected to the reference farm (e.g., farm 8 illustrated in FIG. 4B).

In some embodiments, shock absorbing unit 140 may be a rotary shock absorbing unit configured to rotate as a function of the wheel movement. In some embodiments, a rotary shock absorbing unit 140 may be connected to one of the pivoting connections of the main arms and the first and second linkage units, for examples, in ends 122/222, 124/224, 132/232 and/or 134/234. For example, shock absorbing unit 140 may be a rotary spring or a rotary damper.

Shock absorbing unit 140 may include any mechanical, hydraulic, magnetic, electrical, pneumatic devices or combination thereof that may be configured to absorb and dampen shock impulses, by converting the kinetic energy of the shock into heat, electrical current and/or magnetic flux. Shock absorbing unit 140 may include at least one of: a spring (illustrated in FIG. 1A), mono-tube shock absorber, twin-tube shock absorber, Coilover shock absorber (illustrated in FIG. 1B), a rotary damper, air shocks absorber, magnetic shocks absorber, energy harvesting shocks absorber and hydro-pneumatic shocks absorber and the like.

In some embodiments, assembly 205 may further include arm extension 250, illustrated in FIG. 4A, for extending the distance between end points 224 and 232 to increase the stroke of shock absorbing unit 140. In some embodiments, assembly 105 may further include one or more limits 260, also illustrated in FIG. 2A, for preventing end 132 from hitting end 224 and/or preventing end 222 from hitting end 234.

Reference is now made to FIG. 4B, which is an illustration of in-wheel suspension 100 assembled inside a rim 16 of wheel 10 and connected to reference frame 8, for example, connected to a chassis of a vehicle, according to some embodiments of the invention. In some embodiments, the maximal allowable movement of second end 124 or 224 of first linkage unit 120 or 220 or second end 134 or 234 of second linkage unit 130 or 230 with respect to connection point 115 of main arm 110 may be less than an inner radius of inner rim 16 of wheel 10. Such configuration may allow inner rim 16 to fully accommodate assembly 105 or 205 of in-wheel suspension 100. In some embodiments, the width of assembly 105 or 205 may be less than the depth of the inner rim of the wheel. In some embodiments, the overall width of assembly 105 or 205 may exceed the depth of inner rim 16 of wheel 10 as illustrated in FIG. 1B. In some embodiments, most of the width of assembly 105 or 205 may be accommodated inside inner space of rim 16 of wheel 10, as illustrated in FIG. 1A and FIGS. 3A-3B.

Reference is now made to FIGS. 5A-5C which are illustrations of the position of the arms of the in-wheel suspension at 3 different positions of the wheel and the chassis, according to some embodiments of the invention. The two dashed line presents the position of the vehicle's chassis when the vehicle is on a road 50. A discussed herein above, such an assembly may allow connection point 115 connected to shaft point 18 of the wheel 10, to move in substantially straight line and to form the Watt's linkage. Therefore, when wheel 10 hits road 50, regardless of the conditions of the road, the chassis (presented in dashed lines) is kept substantially at the same place and only linkage units 120/220 and 130/230 and shock absorbing unit 140 are configured to move. For example, when the wheel hits a bump 52 in road 50, as illustrated in FIG. 5A, end point 124/224 of linkage unit 120/220 apply force on shock absorbing unit 140, causing unit 140 to compress and absorb the impact from bump 52 and further allow connection point 115 (e.g., the midpoint) to move upwards while allowing the chassis to stay at substantially the same location with respect to road 50. In another examples, illustrated in FIG. 3B, assembly 105/205 is completely balanced on road 50 such that connection point 115 is located at the a-point determined by preload setting between end 124/224 and end 134/234 when the wheel is traveling on a flat road 50. However, when the wheel hits a pit 54 in road 50, illustrated in FIG. 5C, ends 124/224 and 134/234 are pushed upwards, shock absorbing unit 140 extends (e.g., while absorbing the shock) allowing connection point 115 to move downwards while allowing the chassis to stay at substantially the same location with respect to road 50.

As can be seen from FIGS. 5A-5C an in-wheel suspension system according embodiments of the invention may allow a vehicle to remain substantially balanced on the road regardless of the obstacle each wheel tackles separately, thus allowing much more comfortable ride to passengers in the vehicle.

As would be understood by one skilled in the art, the linkage units, the pivoting connections and the linkage elements illustrated and discussed with respect to FIGS. 2-5 are given as examples only, and the invention as a whole is not limited to these specific configurations.

Figure 6:
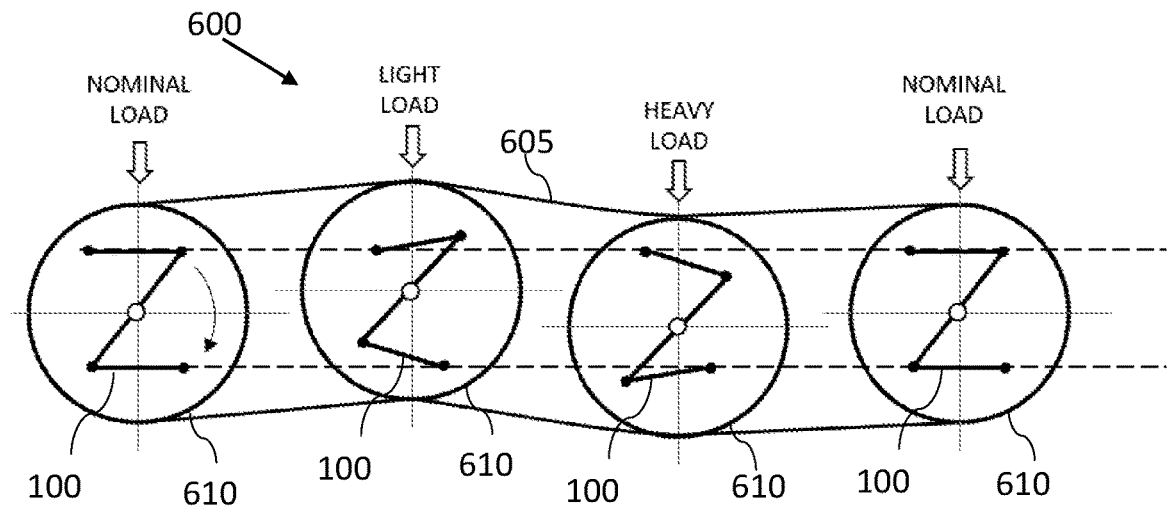
FIG. 6 is an illustration of an assembly of the in-wheel suspension system in a conveyor according to some embodiments of the invention.

Reference is now made to FIG. 6, which is an illustration of the in-wheel suspension system assembled in a conveyor according to some embodiments of the invention. A conveyor 600 may include a belt 605 and one or more wheels 610, each including in-wheel suspension system 100 according to some embodiments of the invention. In some embodiments, the assembled in-wheel suspension system 100 may allow damping shocks caused by various goods uploaded to conveyor 600, thus protecting the motor (not illustrated) and other drivetrain and structural parts of conveyor 600. In some embodiments, the uploaded goods may apply substantially a nominal load (e.g., the average load to which the conveyor were designed to carry) on conveyor 600. In such a case, suspension system 100 may absorb the load and may remain substantially at its nominal (e.g., center) position. In some embodiments, when conveyor 600 is loaded with loads either higher or lower than the nominal load, the main arm and linkage units of suspension system 100 may move to allow both shock absorbing and a movement compensation. In case of a load higher than the nominal load, suspension system 100 may be compressed, and in case of a load lower than the nominal load, suspension system 100 may be extended.

Figures 7A, 7B:
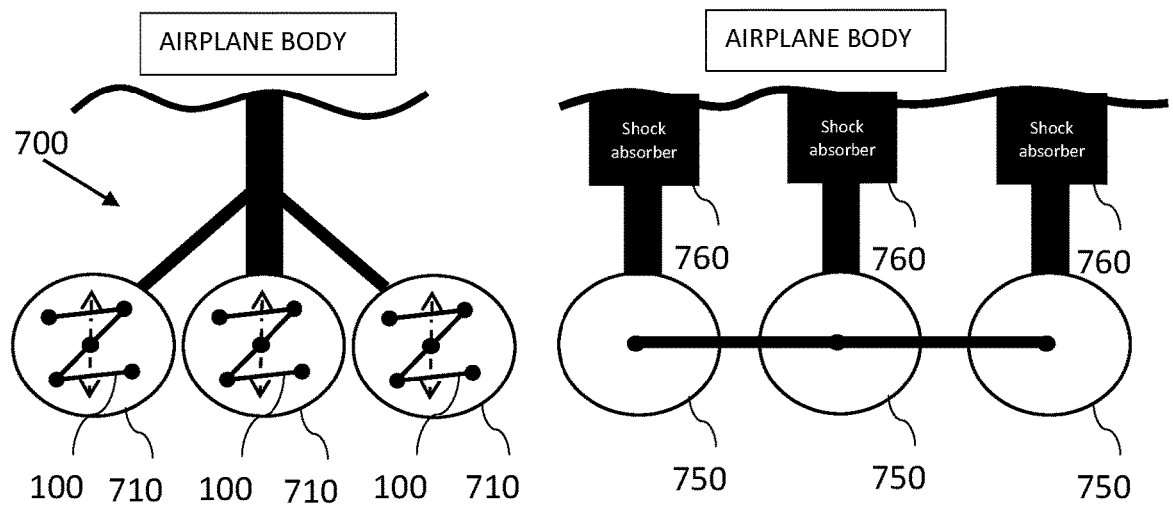
FIG. 7A is an illustration of an assembly of the in-wheel suspension system in an airplane's landing gear according to some embodiments of the invention.
FIG. 7B is an illustration of commonly used airplane's landing gear for comparison with the airplane landing gear of FIG. 7A.

Reference is now made to FIG. 7A, which is an illustration of an airplane landing gear according to some embodiments of the invention. A landing gear 700 may include two or more wheels 710, each including an in-wheel suspension system 100 according to some embodiments of the invention. In comparison, the commonly used landing gear illustrated in FIG. 7B includes two or more wheels 750 each being damped by an external shock absorber 760. Therefore, the commonly used landing gear has limited size for wheels 750, since room must be left for shock absorbers 760. Furthermore, all of wheels 750 are assembled to a single rigid chassis, which forces all the wheels to act together in response any obstacle.

In comparison, placing suspension system 100 inside wheel 710 may allow extending the diameter of wheels 710, thus allowing a better traction of wheels 710. In some embodiments, placing suspension system 100 inside wheel 710 may allow saving of the total volume consumed by landing gear 700. Furthermore, landing gear 700 may allow each one of wheels 710 to tackle an obstacle separately, thus providing better sock absorbing to the airplane.

In some embodiments, in-wheel suspension system 100 may be assembled in other mechanical or machinery systems, and reference frame 8 may be included in or connected to such mechanical or machinery systems. In some embodiments, when a motorized industrial system includes a narrow footprint of a rotating shaft which requires a predictable dynamic response, an in-wheel suspension 100 according to some embodiments of the invention may provide the necessary solution. For example, suspension 100 may be implemented to various textile machines, mechanical presses, industrial printers and the like. As should be understood by one skilled in the art, the vehicle, the conveyor and the airplane landing gear are given as examples only.

Figure 8:
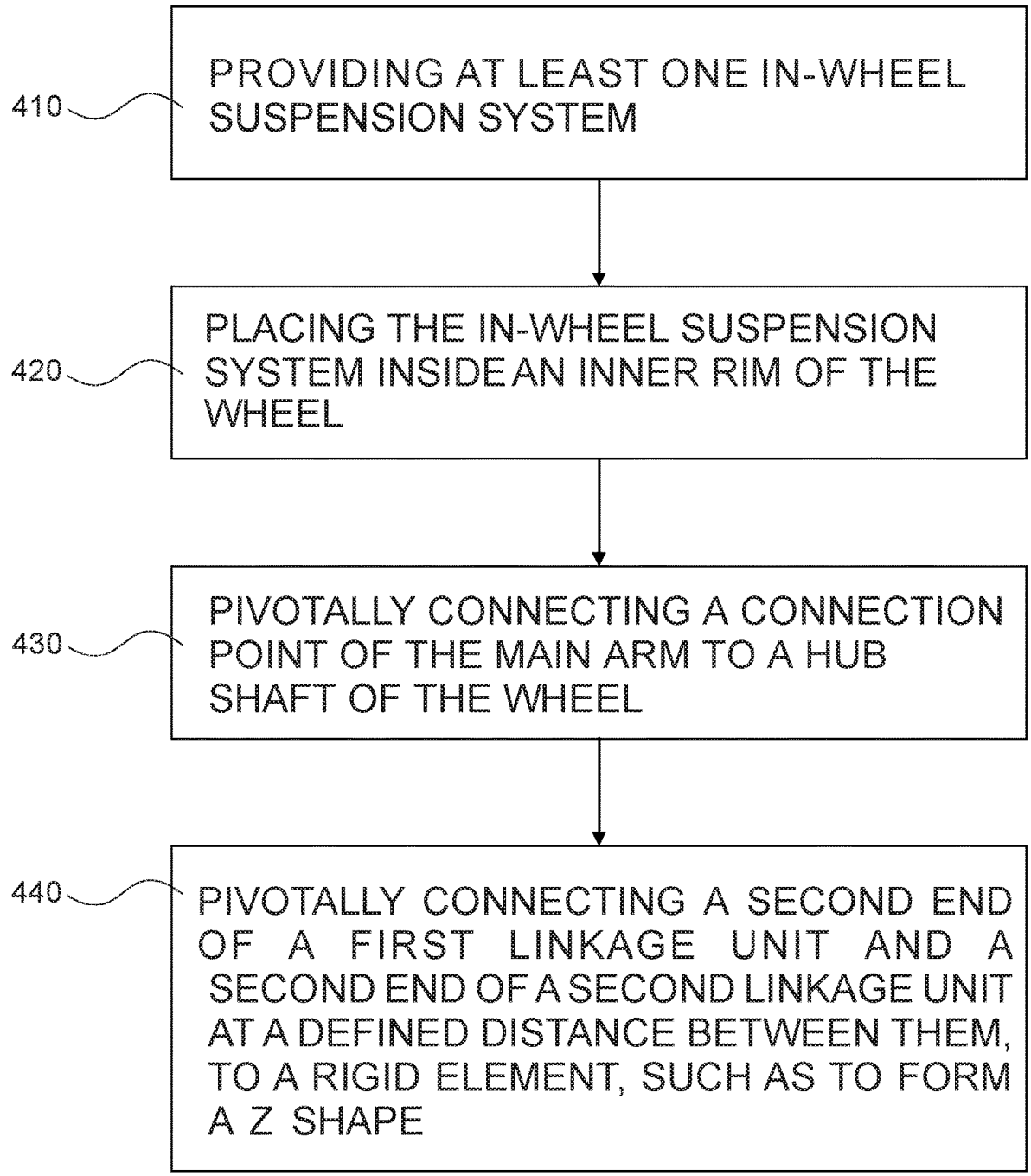
FIG. 8 is a flowchart of a method of assembling an in-wheel suspension system in a vehicle or a mechanical system according to some embodiments of the invention.

Reference is now made to FIG. 8, which is a flowchart of a method of assembling an in-wheel suspension in a vehicle or other mechanical system according to some embodiments of the invention. In box 410, at least one in-wheel suspension systems may be provided, for example, one of in-wheels suspension systems 100 illustrated in FIGS. 1-5. In some embodiments, a first pair of in-wheels suspension systems 100 may be provided to be assembled to the front wheels of the vehicle, and/or a second pair of in-wheels suspension systems 100 may be provided to be assembled to the rear wheels of the vehicle.

In box 420, the in-wheel suspension may be placed inside an inner rim of the wheel. For example, in-wheel suspension system 100 may be placed inside inner-rim 16, as illustrated in FIGS. 1A, 1B, 3A, 3B, 4A and 5A-5C. In box 430, a connection point of the main arm may be pivotally connected to a shaft point of the wheel. For example, midpoint 115 may include a bore and a bearing to be pivotally connected shaft point 18 of wheel 10.

In box 440, a second end of the first linkage unit and the second end of the second linkage unit may be pivotally connected at a defined distance between them to a reference frame (e.g., reference frame 8) such as to form a substantially 'Z' like shape. For example, second end 124 of first linkage unit 120 and second end 134 of second linkage unit 130 may be connected at a predefined distance to reference frame 8, which may be, for example, the chassis of the vehicle or an element connectable to the chassis of the vehicle. In some embodiments, reference frame 8 may be included in any mechanical system, such as conveyor 600 and landing gear 700 illustrated in FIGS. 6-7. Such a connection may form a Watt's linkage that includes main arm 110, first linkage unit 120 and second linkage unit 130, as to allow the movement of connection point 115 to be restricted with respect to the second ends of the first and the second linkage units (e.g., ends 124 and 134) along a single substantially straight line (e.g., the normal to the road, when the vehicle is on the road). In some embodiments, when assembled inside the inner rim, the maximal allowable movement of the second end of the first linkage unit or the second end of the second linkage unit with respect to the connection point of the main arm may be less than a radius of the inner rim of the wheel.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. An in-wheel suspension system comprising:
an assembly comprising:
a main arm pivotally connectable at a connection point of the main arm to a shaft point of a wheel;
at least a first linkage unit pivotally connected at a first end to a first end of the main arm;
at least a second linkage unit pivotally connected at a first end to a second end of the main arm,
wherein at least one second end of the first linkage unit and at least one second end of the second linkage unit, that are not connected to the main arm, are pivotally connectable each to a reference frame at a defined distance between them, such as to form a substantially "Z" shape; and
at least a third linkage unit having a first end pivotally connected to the main arm at a defined location and a second end pivotally connected to the reference frame.

2. The in-wheel suspension system of claim 1, wherein at least one of the first end and the second end of the third linkage unit is pivotally connected via a spherical joint.

3. The in-wheel suspension system of claim 1, wherein at least one of:
a first end of the first linkage unit pivotally connected at the first end of the main arm; and
a first end of the second linkage unit pivotally connected at the second end of the main arm,
are pivotally connected via a spherical joint.

4. The in-wheel suspension system of claim 1, wherein the at least one second end of the first linkage unit and at least one second end of the second linkage unit are connected so as to allow the respective unit to pivot axially around a first axis and a second axis respectively.

5. The in-wheel suspension system of claim 4, wherein the first axis and the second axis are off parallel from each other.

6. The in-wheel suspension system of claim 1, wherein each linkage unit comprises one or more linking elements and two or more pivoting connections.

7. The in-wheel suspension system of claim 6, wherein the one or more linking elements is selected from the group consisting of: an arm, a rod, a lever and a shaft.

8. The in-wheel suspension system of claim 6, wherein the two or more pivoting connections are selected from the group consisting of: bearings, hinges and spherical joints.

9. The in-wheel suspension system of claim 1, wherein the assembly is configured to restrict the movement of the connection point with respect to the second ends of the first and the second linkage units along a substantially straight line.

10. The in-wheel suspension system of claim 1, wherein the overall width of the assembly exceeding the depth of the inner rim of the wheel.

11. The in-wheel suspension system of claim 1, wherein the overall width of the assembly is at most the depth of the inner rim of the wheel.

12. The in-wheel suspension system of claim 1, wherein the third linkage unit comprises a shock absorbing unit.

13. The in-wheel suspension system of claim 12, wherein the shock absorbing unit may be connected to the assembly between two connection point configured to allow the shock absorbing unit to alter its length in response to change in the position of at least one of: the main arm and the first and second linkage units.

14. The in-wheel suspension system of claim 12, wherein the shock absorbing unit is connected to one of the pivoted connections of at least one of: the main arms and the first and second linkage units.

15. The in-wheel suspension system of claim 12, wherein the shock absorbing unit is selected from the group consisting of: a spring, mono-tube shock absorber, twin-tube shock absorber, Coilover shock absorber, a rotary damper, air shocks absorber, magnetic shocks absorber, energy harvesting shocks absorber and hydropneumatic shocks absorber.

16. The in-wheel suspension system of claim 1, wherein the reference frame is one of: a chassis of the vehicle and an element connectable to the chassis of the vehicle.

17. The in-wheel suspension system of claim 1, wherein the maximal allowable movement of the at least one second end of the first linkage unit or the at least one second end of the second linkage unit with respect to the connection point of the main arm is less than a radius of an inner rim of the wheel.

18. A wheel comprising:
an inner rim; and
the in-wheel suspension system according to claim 1 assembled in the inner rim.

19. A method of assembling an in-wheel suspension system in a mechanical system, comprising:
providing at least one in-wheel suspension system comprising:
an assembly comprising:
a main arm;
at least a first linkage unit pivotally connected at a first end to a first end of the main arm;
at least a second linkage unit pivotally connected at a first end to a second end of the main arm; and
at least a third linkage unit having a first end pivotally connected to the main arm at a defined location and a second end pivotally connected to the reference frame, wherein the third linkage comprises a shock absorbing unit;
placing the in-wheel suspension system inside an inner rim of the wheel;
pivotally connecting a connection point of the main arm to a shaft point of the wheel; and
pivotally connecting at least one second end of the at least one first linkage unit and at least one second end of the second linkage unit at a defined distance between them to a reference frame, such as to form a substantially "Z" shape.

* * * * *